US007922390B2

(12) United States Patent
Holt et al.

(10) Patent No.: US 7,922,390 B2
(45) Date of Patent: Apr. 12, 2011

(54) METHOD AND APPARATUS TO FACILITATE FORMING DETECTOR-LEVEL CALIBRATION INFORMATION FOR A HIGH ENERGY-BASED SCANNER

(75) Inventors: Kevin Holt, Chicago, IL (US); Charles R. Smith, Libertyville, IL (US)

(73) Assignee: Varian Medical Systems, Inc., Palo Alto, CA (US)

( * ) Notice: Subject to any disclaimer, the term of this patent is extended or adjusted under 35 U.S.C. 154(b) by 171 days.

(21) Appl. No.: 12/046,337

(22) Filed: Mar. 11, 2008

(65) Prior Publication Data

US 2008/0240365 A1 Oct. 2, 2008

Related U.S. Application Data

(60) Provisional application No. 60/908,850, filed on Mar. 29, 2007.

(51) Int. Cl.
*G01D 18/00* (2006.01)

(52) U.S. Cl. .......................................... 378/207; 378/18

(58) Field of Classification Search .................... 378/18, 378/207

See application file for complete search history.

(56) References Cited

U.S. PATENT DOCUMENTS

| | | | | |
|---|---|---|---|---|
| 5,214,578 | A * | 5/1993 | Cornuejols et al. | 378/207 |
| 5,442,674 | A * | 8/1995 | Picard et al. | 378/20 |
| 2003/0163271 | A1* | 8/2003 | Chell et al. | 702/107 |
| 2003/0167142 | A1* | 9/2003 | Chell et al. | 702/107 |
| 2004/0022364 | A1* | 2/2004 | Stierstorfer et al. | 378/207 |
| 2007/0116183 | A1* | 5/2007 | Ueki et al. | 378/207 |
| 2007/0172033 | A1* | 7/2007 | Gorges et al. | 378/207 |
| 2007/0274456 | A1 | 11/2007 | Holt | |

FOREIGN PATENT DOCUMENTS

WO 2007050083 A1 5/2007

OTHER PUBLICATIONS

Noo et al., "Analytic Method Based on Identification of Ellipse Parameters for Scanner Calibration in Cone-Beam Tomography," Physics in Medicine and Biology, vol. 45, 2000, pp. 3489-3500.

Bingham et al., "Calibration and Performance Testing for Reconfigurable Computed Tomography Systems," Materials Evaluation, Nov. 2007, 6 pages.

Hsieh, Computed Tomography: Principles, Design, Artifacts, and Recent Advance; pp. 12-13; SPIE Press; 2003.

* cited by examiner

*Primary Examiner* — Edward J Glick
*Assistant Examiner* — Alexander H Taningco
(74) *Attorney, Agent, or Firm* — Fitch, Even, Tabin & Flannery

(57) ABSTRACT

The provision of calibration information for a given high energy-based scanner having a plurality of detectors can comprise forming (103) detector-level calibration information for that scanner. This can comprise calculating (201) a theoretical trajectory as pertains to relative movement as between the plurality of detectors and a calibration object as a function of known geometry parameters for this particular scanner and then causing (202) relative movement as between this plurality of detectors and a calibration object to develop a corresponding observed trajectory for the calibration object. These teachings then provide for determining (203), for each of at least some of the plurality of detectors, a value that corresponds to a difference between the theoretical trajectory and the observed trajectory to thereby provide the detector-level calibration information.

20 Claims, 3 Drawing Sheets

103 FORM DETECTOR-LEVEL CALIBRATION INFORMATION

201 CALCULATE A THEORETICAL TRAJECTORY AS PERTAINS TO RELATIVE MOVEMENT AS BETWEEN THE PLURALITY OF DETECTORS AND THE CALIBRATION OBJECT AS A FUNCTION OF KNOWN GEOMETRY PARAMETERS FOR THE GIVEN HIGH ENERGY-BASED SCANNER

202 CAUSE RELATIVE MOVEMENT AS BETWEEN THE PLURALITY OF DETECTORS AND A CALIBRATION OBJECT TO DEVELOP A CORRESPONDING OBSERVED TRAJECTORY FOR THE CALIBRATION OBJECT

203 DETERMINE, FOR EACH OF AT LEAST SOME OF THE PLURALITY OF DETECTORS, A VALUE THAT CORRESPONDS TO A DIFFERENCE BETWEEN THE THEORETICAL TRAJECTORY AND THE OBSERVED TRAJECTORY TO THEREBY PROVIDE THE DETECTOR-LEVEL CALIBRATION INFORMATION

204 USE THE VALUE TO DETERMINE A SPATIAL RELATIONSHIP BETWEEN AT LEAST SOME OF THE PLURALITY OF DETECTORS AND A GIVEN LOCATION AS PERTAINS TO THE GIVEN HIGH ENERGY-BASED SCANNER

205 MODIFY AT LEAST SOME OF THE GLOBAL CALIBRATION INFORMATION AS A FUNCTION, AT LEAST IN PART, OF THE EMPIRICALLY OBSERVED TRAJECTORY

METHOD AND APPARATUS TO FACILITATE FORMING DETECTOR-LEVEL CALIBRATION INFORMATION FOR A HIGH ENERGY-BASED SCANNER

RELATED APPLICATION(S)

This application claims the benefit of U.S. Provisional application No. 60/908,850, filed Mar. 29, 2007, which is incorporated by reference in its entirety herein.

This application is related to co-owned U.S. patent application Ser. No. 12/046,347, entitled METHOD AND APPARATUS TO FACILITATE RECONSTRUCTING AN IMAGE USING FAN-BEAM DATA and filed on even date herewith (Mar. 11, 2008), which is incorporated by reference in its entirety herein.

TECHNICAL FIELD

This invention relates generally to high energy-based scanners and more particularly to the calibration of such equipment.

BACKGROUND

High energy-based scanners are known in the art. Such scanners employ, for example, X-rays to scan an object of interest. This typically involves using a plurality of detector elements to detect the intensity of the scanning energy as the latter interacts with the object of interest.

In many cases, the detector elements for a given high energy-based scanner are not perfectly evenly spaced. The spacing irregularities may be either gradual or abrupt (the tendency of any given detector will generally depend on its construction details). These spacing irregularities, in turn, can result in distorted scanning results. When applied in a computed tomography (CT) application setting, for example, spacing irregularities can result in warped reconstructed images and/or an inclusion of artifacts in the image such as blurring, streaking, rings, or doubling. When applied in a digital radiography (DR) application setting, such irregularities can prevent accurate image registration, can prevent one from truly resampling to a uniform flat imaging plane, and/or may be visually distracting and/or annoying.

As a result, it is also known to calibrate the processing steps as are employed to process scanning output to attempt to accommodate the inherent distortion as is associated with a given high energy-based scanner. By one approach, this has comprised conducting a fixed position scan of a fixed array or grid of equally spaced vertical wires (presuming, of course, that the channels are horizontally arranged) and measuring the channel number locations of each wire. Interpolation is then used to form a distortion correction table. By another approach (used in particular for translate-rotate computed tomography), one conducts a translation of an off-center pin, repeating for 8 equally spaced rotation positions, measuring the trajectory of the pin through each of the 8 scans, measuring several statistics from this trajectory, and returning an estimated distortion measurement as a result.

Though effective to a point, such approaches nevertheless are not fully satisfactory. The approaches that rely upon a vertical wire grid suffer in that non-zero width wires yield poor accuracy in that it can be difficult to accurately find the center of the wire with sub-pixel resolution. Spacing between the wires also contributes to poor resolution as one cannot capture discrete distortions or quickly (that is, abruptly) changing continuous distortions. Also, approaches that rely upon wire grids are not practical for use in large scanning systems (such as some of those employed for industrial or security purposes. Furthermore, approaches that require rotation are of course not suitable for systems that do not support rotation (such as DR-only systems) while approaches that require translation are not suitable for systems that do not support translation (such as most DR-only systems and rotate-only CT scanners).

BRIEF DESCRIPTION OF THE DRAWINGS

The above needs are at least partially met through provision of the method and apparatus to facilitate forming detector-level calibration information for a high energy-based scanner described in the following detailed description, particularly when studied in conjunction with the drawings, wherein.

Figure 1:
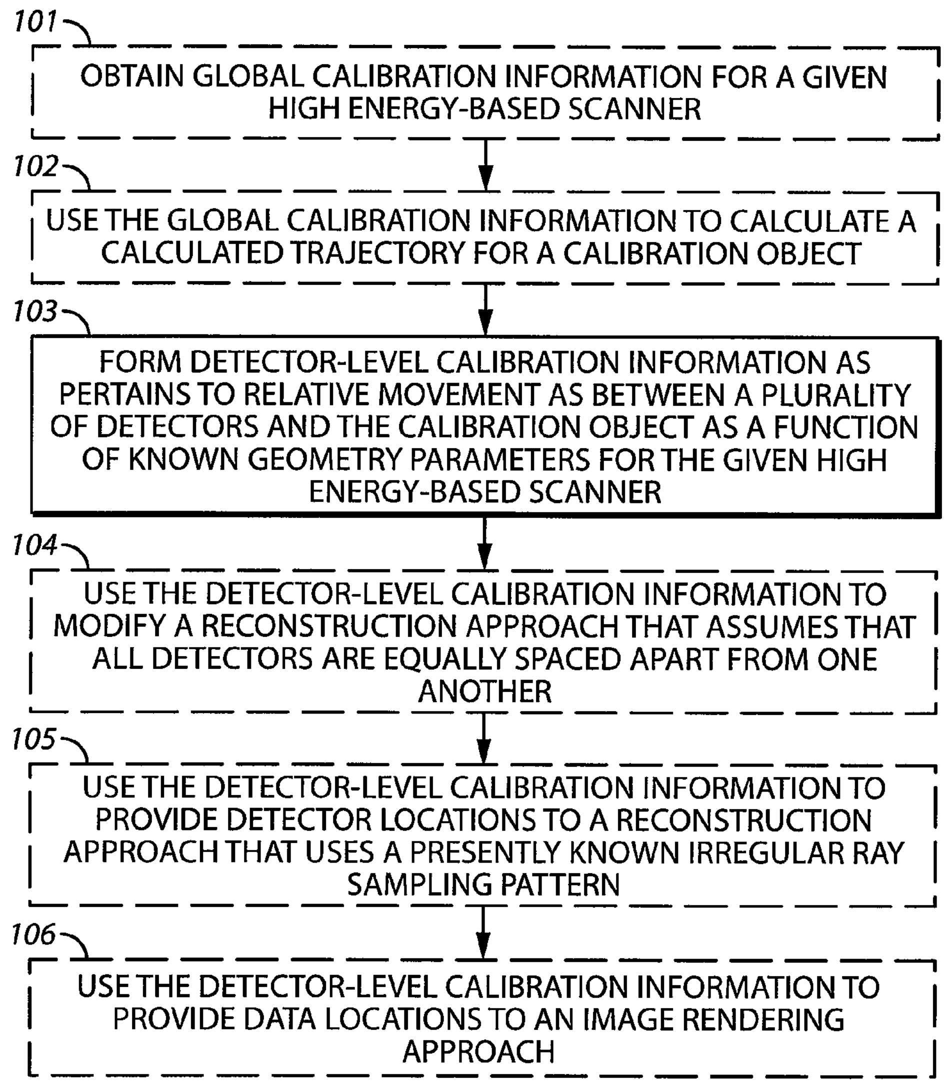
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, the provision of calibration information for a given high energy-based scanner having a plurality of detectors can comprise forming detector-level calibration information for that scanner. This can comprise calculating a theoretical trajectory as pertains to relative movement as between the plurality of detectors and a calibration object as a function of known geometry parameters for this particular scanner and then causing relative movement as between this plurality of detectors and a calibration object to develop a corresponding observed trajectory for the calibration object. These teachings then provide for determining, for each of at least some of the plurality of detectors, a value that corresponds to a difference between the theoretical trajectory and the observed trajectory to thereby provide the detector-level calibration information.

These teachings will accommodate a variety of calibration objects and a variety of ways by which the calibration object interacts with the detectors. For example, these teachings will accommodate using a pin that is oriented substantially parallel to the rotation axis (but usually located a ways away from the rotation axis itself such as barely inside or barely outside the edge of the field of view) when the relative movement comprises concentric rotation of the calibration object with respect to an axis point, an angularly-disposed pin when the relative movement comprises linear movement of the calibration object with respect to the plurality of detectors, or a pin oriented substantially perpendicularly to a direction of motion when the relative movement comprises linear movement of the calibration object with respect to the plurality of detectors.

By one approach, forming the detector-level calibration information can comprise using the aforementioned value to determine a spatial relationship between at least some of the plurality of detectors and a given location as pertains to the given high energy-based scanner. By one approach, this can also comprise using the detector-level calibration information to modify a reconstruction approach that assumes that all detectors are equally spaced apart from one another. By another approach, this can also comprise supplying the detector-level calibration information to a reconstruction approach that regularly accepts irregularly spaced data. By another approach, this can also comprise supplying the detector-level calibration information to an image display or rendering apparatus.

As a preliminary step, these teachings will also accommodate obtaining global calibration information for the given high energy-based scanner and using that information to calculate a calculated trajectory for the calibration object. In such a case, the aforementioned step of calculating a theoretical trajectory as pertains to relative movement as between the plurality of detectors and a calibration object as a function of known geometry parameters for the scanner can comprise using the calculated trajectory and an empirically observed trajectory to provide the theoretical trajectory. In such a case, one may also modify at least some of the global calibration information as a function, at least in part, of the empirically observed trajectory.

Those skilled in the art will appreciate that these teachings permit existing knowledge regarding one or more global parameters of a given high energy-based scanner to be efficiently and quickly leveraged in favor of detector-level calibration information. This information can then be used during ordinary operation of the scanner to yield accurate and useful results. These teachings are robust and highly scalable; as a result, these approaches are readily applicable in a wide variety of application settings and with a wide variety of multi-detector element form factors.

These and other benefits may become clearer upon making a thorough review and study of the following detailed description. Referring now to the drawings, and in particular to FIG. 1, an illustrative process that is compatible with many of these teachings will now be presented. As noted above, these teachings are applicable for use with any of a wide variety of high energy-based scanners so long as those scanners employ a plurality of detectors.

The illustrated process 100 will optionally accommodate obtaining 101 global calibration information for the given high energy-based scanner for which calibration information is sought. As used herein, "global calibration information" will be understood to refer to calibration information that is generally applicable to the scanner as a whole and that is not at the level of resolution of individual detectors (though this global information might comprise, for example, a single value as being representative of the spacing between the detectors). Examples in this regard include, but are not limited to, the distance between the high energy source and the detector array, the distance between the high energy source and the rotate axis, the distance between the high energy source and the focal point of the array (for curved or approximately curved arrays only), the central ray value, the perpendicular ray value, the fan angle, the detector chord length, a motion backlash or differential, a speed of rotation (and/or translation), and so forth. (Those skilled in the art will recognize that other non-geometric global parameters may be useful in this context as well. One example in this regard is the level of crosstalk that might generally exist between the detectors. Also, intermediate global information, such as the location, size, or orientation of the pin, may be calculated internally, even though it may not be externally reported as a calibration result.)

By one approach this global calibration information can be directly measured by an end user and entered into the process by that end user. By another approach, alone or in combination with the approach just noted, such information may be automatically self-gleanable by the platform that is enabling the process 100 and/or by the scanner itself.

In such a case, this process 100 will also optionally accommodate using 102 this global calibration information to calculate a calculated trajectory for the calibration object. As used herein, this reference to "trajectory" will be understood to refer to the record of those detectors in which the calibration object is visible at a given moment in time during a corresponding scanning process or, alternatively, the record of points in time in which the calibration object becomes visible in a given detector. In a typical application setting, this calculated trajectory can take into account global information such as the speed by which the detectors and the calibration object move with respect to one another but will otherwise assume that the detectors are uniformly spaced apart from one another. Accordingly, though calculated using the best information presently available, this calculated result will likely not perfectly match the real world trajectory of the calibration object.

This process 100 then provides for forming 103 detector-level calibration information for the given high energy-based scanner. This step includes forming this information as a function of the known geometry parameters for this particular high energy-based scanner. These known geometry parameters may have been earlier provided via the optional step noted above or may have been obtained in some other way as appropriate to the opportunities that tend to characterize a given application setting.

Figure 2:
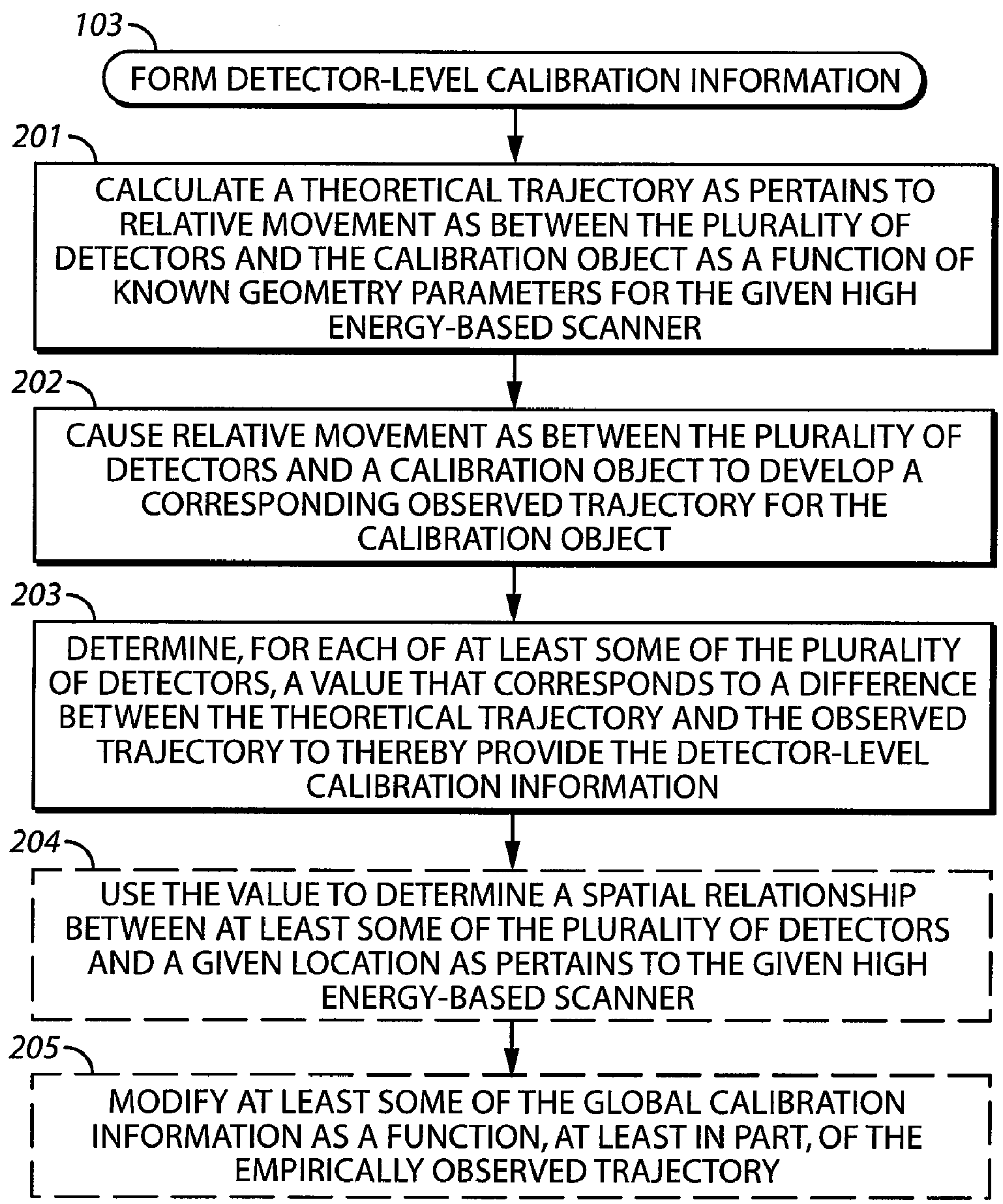
FIG. 2 comprises a flow diagram as configured in accordance with various embodiments of the invention.

There are various ways by which such detector-level calibration information can be so formed. Referring for the moment to FIG. 2, some specific examples in this regard will be provided. Those skilled in the art will appreciate and recognize that the use of such examples is intended to serve only in an illustrative capacity and is not intended to serve as an exhaustive or otherwise limiting example in this regard.

This formation of detector-level calibration information can begin with calculating 201 a theoretical trajectory as pertains to relative movement as between the plurality of detectors and a calibration object as a function of known geometry parameters for the given high energy-based scanner. This calibration object can vary as desired with the application setting. Those skilled in the art will further recognize that this can be met through provision and use of a plurality of calibration objects (which may, or may not, be identical to one another.)

In many application settings the calibration object can comprise a pin. By one approach this pin can comprise a long, thin object that may be no wider, for example, than about three to ten detectors/channels. Those skilled in the art will recognize and understand, however, that such a calibration object can be narrower (even including an object that is narrower than a single channel) or wider (up to, for example, twenty or thirty detectors/channels in width). In most cases, this pin can assume a variety of form factors so long as the pin presents, at least for most application settings, a straight edge (which straight edge need not necessarily correspond to a peripheral boundary of the pin). Generally speaking, this pin will be satisfactory if it has a feature whose location is measurable in such a way as to facilitate forming the aforementioned trajectory of that feature by channel number and as a function of time (or vice versa).

In many cases the pin can comprise a discrete narrow cylinder. Other possibilities exist, however. For example, and particularly when working with very large machines (having, for example, a vertically deployed detector array that is, say, fifteen feet tall), the "pin" can comprise a cable (such as a cable deployed, as suggested below, at a non-horizontal and non-vertical angle with respect to a direction of linear movement). Other more radical "pins" are also allowed, with four examples in this regard including a brick of solid metal (where the location of the edge can be easily identified and tracked), a triangle of solid metal (in effect, an angularly-disposed pin), a ball or set of balls suspended in plastic (where the ball location(s) can be tracked), or the tip of a cone.

The orientation of the pin can vary, of course, with the application setting. As one example in this regard, the pin can be oriented substantially parallel to the rotation axis when the relative movement between the pin and the detectors comprises eccentric (that is, off-center) rotation of the calibration object with respect to the axis point. As another example, the pin can be angularly-disposed when the relative movement comprises linear movement of the calibration object with respect to the plurality of detectors (where "angularly-disposed" will be understood to refer to an angle other than a parallel or a perpendicular orientation (typically, neither horizontal nor vertical) with respect to the direction of motion in a typical radiograph. As yet another example in this regard (for example, when the direction of motion is in the channel direction), the pin can be oriented substantially perpendicular to a direction of motion when the relative movement comprises linear movement of the calibration object with respect to the plurality of detectors.

By one approach, this step of calculating 201 a theoretical trajectory can comprise using the aforementioned calculated trajectory and an empirically observed trajectory. The empirically observed information can be derived, for example, by making a calibration scan using the aforementioned pin of choice and determining which detectors are detecting the pin at which times. Calculating this theoretical trajectory in this fashion can comprise, for example, identifying at least one modification parameter which, when applied to the calculated trajectory, causes the theoretical trajectory to better match the observed trajectory. The particular modification parameter utilized for this purposes, as well as the number of modification parameters employed for this purpose, can vary with the needs and/or requirements of a given application setting.

Those skilled in the art will understand that this step may include, if desired, using a second auxiliary trajectory (or more) in order to seek a better fit between the theoretical trajectory and the observed trajectory. This might involve, for example, using both a rotate scan-based trajectory and a tilted or vertical pin scan in order to obtain a most usable resultant theoretical trajectory.

This activity of forming 103 detector-level calibration information then provides for causing 202 relative movement as between the plurality of detectors and a calibration object (which may, or may not, be the same calibration object as was used above to develop the empirically observed information) to thereby develop a corresponding observed trajectory for the calibration object. This step can further comprise, as desired, measuring the observed trajectory by, on a detector-by-detector basis, analyzing the observed projection data to determine a position of the calibration object where a predetermined feature of the calibration object (such as, but not limited to, a peripheral or interior edge, a centerline, a center, and the like) appears to have passed through a predetermined portion of a channel as corresponds to each detector. Generally speaking, while the notion of a trajectory suggests the use of a list of coordinates, this reference to "projection data" can be understood to refer, for example, to a set of grayscale values that are dependent upon time and channel number (or, equivalently, position and channel number). Thus, the latter can be employed and analyzed to measure the former.

This activity can comprise, for example, analyzing all of the data for each channel, on a channel-by-channel basis (i.e., on a detector-by-detector basis), to determine at what time(s) (if any) the predetermined calibration object feature is detected. This might comprise, for example, determining when the feature of the calibration object appears to have passed through a channel center. For some schemes this might comprise for some channels measuring multiple distinct times where the calibration object feature is detected. For example, for a rotate-scan, for some channels the object may enter the channel, leave the channel, then re-enter the channel later on, while for other channels, the object may appear only once, and for still other channels, the object may never appear at all. By another example, using a calibration object(s) with multiple features, many channels may see the different features at different times. By yet another example, for a translate-scan of a single object feature that begins and ends outside the fan beam (on opposite sides), each channel sees the object feature exactly once.

The relative movement contemplated by this step 202 can of course vary with respect to the application setting. This relative movement can be linear (in either the translation direction or slice direction), rotational, rotational and translational, and so forth. (Those skilled in the art will recognize and understand that this reference to linear movement can comprise linear motion in either the translation direction (for linear movement parallel to the detector and perpendicular to the rotation axis (if present)) or the slice direction (for linear movement parallel to the rotation axis (if present) or perpendicular to a plane that contains the source and detector.) It is also possible for the relative movement to be based upon movement of the calibration object with respect to the source and/or detectors, movement of the source and/or detectors with respect to the calibration object, or both. Numerous examples exist in this regard and are well known to those skilled in the art. As these teachings are not particularly sensitive to any particular selections in this regard, for the sake of brevity further elaboration in this regard will not be provided here.

This formation step 103 then provides for determining 203, for each of at least some of the plurality of detectors (and, in many application settings, for all of the detectors), a value that corresponds to a difference between the theoretical trajectory and the observed trajectory to thereby provide the aforementioned detector-level calibration information. This "value" will be understood to comprise at least one value and might comprise, for example, both an x coordinate value and a y coordinate value if desired.

By one approach, this step 203 can comprise accounting for each detector that detects the calibration object for more than one observed point in time (as well as those detectors that detect the calibration object once or never). In the case when a given detector does detect the calibration object more than once, this process will accommodate, for example, combining the corresponding different measurements for such a detector. This might comprise, for example, averaging the different measurements (for example, appropriate detector-level measurements such as channel position measurements) calculated from the different times when the calibration object is detected.

By one approach, this determined value can be optionally used 204 to determine a spatial relationship between at least some of the plurality of detectors and a given location as pertains to the given high energy-based scanner. By one approach, this could comprise determining a table of angular locations. This might comprise, for example, angular positions with respect to a central ray or angular positions with respect to essentially any other point of reference (such as, for example, a specific one of the channels such as channel 0).

This could also comprise a table of spatial locations that specify coordinates with respect to some imaginary plane or other relational context (such as coordinates along an imaginary arc). In such a case, the coordinates could be expressed, for example, in millimeters (in which case it may be useful to also know or have access to information regarding a distance from the high energy source to that plane/relational context). By another approach, such coordinates could be normalized. This might comprise, for example, normalizing the coordinates against the source-to-detector distance or the source-to-rotation-axis distance, or normalizing the coordinates such that the first channel corresponds to "0" and the last channel corresponds to "1." Other examples with respect to spatial locations might comprise spatial positions on a plane that is perpendicular to the central ray or spatial positions on a plane that is perpendicular to some more arbitrary ray (such as the plane perpendicular to, say, channel 511.5 in a 1,024 channel detector) or to an arbitrary plane that is defined to contain the measured feature of the calibration object.

If desired, information for at least some of the foregoing steps can be used to modify the previously determined global calibration information itself. For example, by one optional approach, this activity can accommodate modifying 205 at least some of the global calibration information as a function, at least in part, of the empirically observed trajectory. This might comprise in a given application setting, for example, modifying the value for the distance from the source to the detector. Such modified information can be reported to service personnel that are adjusting alignment, or reported to the end user to aid in tweaking image quality, and/or it could be injected directly into, say, configuration files in order to automatically cause reconstruction to use the modified values.

Returning now to FIG. 1, following this formation 103 of detector-level calibration information, the results of this activity can be used as appropriate. By one optional approach, for example, this can comprise using 104 the detector-level calibration information to modify a reconstruction approach which assumes that all detectors are equally spaced apart from one another. This can apply both with respect to linearly-aligned detectors with which one typically uses an algorithm which accommodates this flat alignment and to curved detectors with which one typically uses an algorithm that accommodates this curved alignment as will be well understood by those skilled in the art. Furthermore, one can use a relational context (as mentioned earlier) that is different than the physical detector arrangement (where, say, coordinates are measured on a virtual arc for a detector that is nominally flat), then use a reconstruction approach that is intended for the virtual geometry presumed in (or associated with) the relational context, rather than a reconstruction approach that is intended for the nominal physical geometry. This modification of a reconstruction approach which assumes that all detectors are equally spaced apart from one another can comprise modification of a variety of approaches.

By one example, this can comprise modifying a filtered back-projection algorithm as a function of the detector-level calibration information (for example, by introducing a channel-dependent convolution filter). As another example, this can comprise modifying an iterative statistical reconstruction algorithm as a function of the detector-level calibration information (for example, by adjusting the projection weights based on the local channel density). As yet another example, this can comprise modifying a reconstruction approach based on Fourier slice theory. And as yet another example, this can comprise resampling data as a function of the detector-level calibration information to cause the data to appear as through the detectors are equally spaced apart. Those skilled in the art will understand that these comprise only a selected few of a larger variety of options in this regard.

By another optional approach, these teachings will accommodate using 105 the detector-level calibration information to provide detector locations to a reconstruction approach that accepts a description of an irregular ray sampling pattern as part of its inputs. Examples in this regard again include, but are not limited to, a filtered back-projection algorithm, a Chebychev-filtering+backprojection algorithm, the method of the aforementioned METHOD AND APPARATUS TO FACILITATE RECONSTRUCTING AN IMAGE USING FAN-BEAM DATA, an iterative statistical reconstruction algorithm, Fourier-slice approaches, and the resampling of data as a function of the detector-level calibration information to cause the data to appear as though the detectors are equally spaced apart.

Yet another optional approach provides for using 106 the detector-level calibration information to provide data locations to an image display device or rendering approach (such as a data resampling approach). Other options are no doubt presently available with yet others likely to be developed in the future. Those skilled in the art will recognize that the aforementioned optional approaches to using the detector-level calibration information are not necessarily mutually exclusive and may be used in combination if desired.

For the sake of example a more detailed instantiation that accords with these teachings will now be provided. Those skilled in the art will appreciate and recognize that the presentation of such details is intended to serve only as an illustrative example and is not intended to serve as an exhaustive or otherwise limiting example in this regard.

The details of each step for this particular illustrative instantiation are described below. (Those skilled in the art will recognize and understand that this particular example relates to a fan-beam application setting but that these teachings are equally applicable to a cone-beam application setting.) Note that the input data, expressed as:

$$P(ch,view)$$

comprises the projection data. In many cases, it may be desirable for this data to be preprocessed, undergoing such steps as offset-subtraction, air-normalization, reference correction, and/or logarithm. Several parts of the description below assume that the data has been corrected for offsets and air and that the minus-log has been taken (though those skilled in the art may recognize that it might be possible to not make such assumptions)

Find Gross System Geometry

The general approach is as follows. The user provides whatever knowledge is available and then the trajectory of the pin is measured. This results in a set of (ch,view) coordinates that trace the center (or feature) of the pin. The expected trajectory of the pin is then expressed as a function of time (or position), the location of the pin (i.e. for a rotate scan, the position of the pin (often in polar coordinates) relative to the rotation axis, or for a scan with linear motion, the position and orientation of the pin relative to, say, the motion axis or the detector), and of the gross system geometry parameters. One then finds the parameters that make the measured trajectory best match the expected trajectory. The parameters are then interpreted into values of interest to the user. Additional details (most of which are intended for a rotate-only CT acquisition) are as follows.

User Provides Whatever Knowledge is Available

The "measure the trajectory of the pin" step requires a rough guess of PinWidthInChannels which is the typical projected width of a pin onto the detector in the channels. The "find the parameters that make the measured trajectory match the expected" step fundamentally searches for the best values of $\Delta\gamma$ the angular pitch in radians near the central ray, $$\Delta\gamma = \frac{ChPitch}{SID} = \frac{FanAngle}{Nch - 1}$$

R the normalized pin location, $$R = \frac{PinDistFromRotAxis}{SOD}$$

$c_{ray}$ the central ray value $\phi$ the phase of the pin (i.e. for what $\beta$ value is the pin located closest to the source)

In general, though, instead of the above, a user may be interested in such parameters as SID, SOD, ChPitch, FanAngle, Perpendicular Ray, or ChordLength. These, however, are all inter-related.

One may presume to designate each parameter into one of three types:

Known The user has previously measured the true value and it can be considered fixed Estimated The user has a rough guess of the value (i.e. from a crude measurement with a tape measure, or from the nominal value from design drawings).

Find The user has no idea what the value of this parameter is. If unspecified, a value is by default considered to be type Find.

This description will use the "$_o$" subscript to denote the user supplied known or estimated values. These values will be used to derive initial guesses for the values of type find. These initial guesses can be marked with the same "$_o$" subscript.

The derived initial guesses for type-find value can be calculated as follows:

if $\Delta\gamma$ is Find then
    if (ChPitch is not Find) and (SID is not Find)

$$\Delta\gamma_o = \frac{ChPitch_o}{SID_o}$$

if (ChPitch is Known) and (SID is Known) then
            Label $\Delta\gamma$ as Known
        else
            Label $\Delta\gamma$ as Estimated
        end -continued else if (FanAngle is not Find)

$$\Delta\gamma_o = \frac{FanAngle}{N_{ch} - 1} \quad \text{for curved}$$

(a similar $\Delta\gamma$ calculation can be derived for flat)
        Give $\Delta\gamma$ the same label as FanAngle
    end
end
if (SOD is not Find) and (PinDistFromCenter is not Find) then $$R_o = \frac{PinDistFromCenter_o}{SOD_o}$$

if (PinDistFromCenter is Known) and (SOD is Known) then
        Label $R_o$ as Known
    else
        Label $R_o$ as Estimated
    end
end Note that other values, such as ChordLength, could easily be incorporated as yet another value interdependent with ChPitch, SID, FanAngle, and $\Delta\gamma$ if desired.

Since it can be difficult to know any value with exact certainty, it may be best to fix either ChPitch or SID (but not both) as being "known" and leave everything else as estimated. For many applications (such as rotate-only CT scanning), it is fine for this "known" value to be slightly (or even wildly) inaccurate—the described approach will produce a value for the other value (ChPitch or SID, whichever isn't known) that is inaccurate as well but where the ratio of the two values is correct (often this ratio is all that is important to produce a good image). For some application settings the exception is $C_{ray}$. If the pin does not leave the scan field of view, then $c_{ray}$ can be left as Find or Estimated, but if the pin leaves the field of view, then it may in some cases be useful to first calibrate with some other means (such as is disclosed in METHOD AND APPARATUS TO FACILITATE DETERMINATION OF A PARAMETER THAT CORRESPONDS TO A SCANNING GEOMETRY CHARACTERISTIC (U.S. Published Patent Application 20070274456) or such as a more centered pin (where those skilled in the art will understand that methods to effect central ray measurements are known in the art for centered pins) and then provide the $c_{ray}$ value as being known.

By one approach, the user may enter a pin-width in channels or pin-width in millimeters.

If pin width is entered in channels, this is the value for Pin WidthInChannels.

Else (pin width is entered in mm) and (SOD is not Find) and ($\Delta\gamma_o$ is available) then $$PinWidthInChannels = \frac{\text{PinWidth\_mm}}{\Delta\gamma_o = SOD_o}$$

Else

By another approach, the PinWidthInChannels may be measured directly from the data. This approach can work, for example, by optionally extracting a subset of views from the full projection data (say, for example, a total of 20 views from various times throughout the acquisition). The approach would also establish some criterion (such as the average across all used views of the maximum normalized cross-correlation for each view) for measuring how well the measured profiles match a theoretical template for the projection of a pin of a specified width. Then the approach searches for the value of pin width that maximizes the measurement criterion. The search can be iterative, or it can be through a brute force search of a list of candidates, or it can be first with a brute force search to get an initial value then secondly with an iterative search to refine the value. Note that the user can also be given the opportunity to designate pin width as Known, Estimated, or Find, where Known leads one to apply the first approach (PinWidth is user-supplied), Estimated leads one to use the user-provided value as the initial value for an iterative search, and Find leads one to perform a brute force search followed by an iterative search.

Measure the Trajectory of the Pin (as a Function of View)

The pin trajectory can be measured in either of at least two basic ways. The first approach is to, for each view, look for the pin-center. This gives a channel-measurement for each view. The second approach is to, for each channel, look for which view contains the center of the pin. This may be more complicated in that some channels may never see the pin, while other channels may see it once, and still others may see it twice (or more). This description will use the finding the pin for each view approach.

One potential approach for finding the pin is to threshold the sinogram and find the center of mass (either as a $0^{th}$ or $1^{st}$ moment). An alternate approach is to calculate the cross-correlation between the sinogram and an ideal profile of the pin. The latter approach may provide benefits in at least some application settings.

For the cross-correlation method one generates an ideal profile which is referred to herein as a template. This is some function Template(x) that is roughly (if not exactly) semi-circular in shape and with its center (and therefore maximum) at x=0. This template will naturally be some function of the pin width, Pin WidthIn Channels.

The theoretical ideal profile of a pin, to within a scale factor, is a semi-circle:

$$\text{Template}(x) = \begin{cases} \sqrt{\left(\frac{PinWidthInChannels}{2}\right)^2 - x^2}, & \text{if } |x| \le \frac{PinWidthInChannels}{2} \\ 0, & \text{if } |x| \ge \frac{PinWidthInChannels}{2} \end{cases}$$

One could also consider using a Gaussian:

$$\text{Template}(x) = e^{-\frac{x^2}{2\sigma^2}}$$

where there is some leeway in choosing the right σ. A simple choice is:

$$\sigma = \text{Pin WidthInChannels}/2$$

or one can make the Gaussian template have the same full-width-half-max as the semi-circle template by choosing:

$$\sigma = \frac{PinWidthInChannels}{4} \times \sqrt{\frac{3}{2\log(2)}}$$

Either choice is reasonable. This description makes use of the semi-circle template.

Now one finds the cross-correlation. The cross-correlation of some view P( . . . , view) with the template is:

$$xcorr(ch, \text{view}) = \sum_x P(ch + x, \text{view}) \times Template(x)$$

(Note that this is un-normalized cross-correlation, which is generally fine when the pin width is fixed. When searching for pin-width, a normalization term should generally be included to account for the PinWidth-dependence of the energy in the template function). From this, for each view, one finds the value of ch for which xcorr is at a maximum, then this maximum-channel indicates the location of the pin for that view. To get sub-pixel accuracy, one may sum over a fine grid of x, say in increments of 1/16th of a channel, interpolating P at the necessary positions. The interpolation could be explicit, such as with linear interpolation, spline, sinc, and so forth, or implicit, such as when calculating the cross-correlation with zero-padded FFT's. For many application settings, sinc (or, similarly, zero-padded FFT's) is likely to be optimal though the linear interpolation can sometimes be the fastest choice.

The interested reader may note that the cross-correlation is essentially a matched filter, which is equivalent to a convolution. Since convolutions can be implemented by Fast Fourier Transforms (FFT), one can write the above as:

$$xcorr(ch,\text{view}) = \text{IFFT}(\text{FFT}(P) \times \text{FFT}(\text{Template}))$$

where FFT is the forward Fourier Transform, and IFFT is the inverse transform. This can be faster than the naive implementation. Conveniently, one can also effectively incorporate sinc-interpolation of P for sub-pixel accuracy into the above equation by writing $$xcorr(ch', \text{view}) = \text{IFFT}(\text{zeropad}(\text{FFT}(P)) \times \text{FFT}(\text{Template'}))$$

where Template' is the template evaluated on a fine grid, and ch' is the output on that same grid. Specifically, when seeking subpixel accuracy sub, then Template' can be evaluated on increments of (1/sub). The FFT of P, however, is evaluated on the original grid (i.e., evaluated on increments of 1), and then the FFT is padded with enough zeros in the high frequency slots to increase its size by a factor of sub. One then finds the ch' for which xcorr is maximum, and the pin-center is then at location $$ch_{pin}(\text{view}) = ch'/\text{sub}.$$

Note that that the above requires calculations on every channel of P. Alternatively, one can look for the maximum pixel value for each view, or some similar indication (such as temporarily smoothing the profile then looking for the maximum pixel value in the smoothed profile) that gives the rough location of the pin. Unless there is excessive noise in the system, that brightest pixel will almost always come from within the pin (this is for minus-logged data—for unlogged data, one could search for the darkest pixel instead). Then one only need to calculate the cross-correlation in the neighborhood of that indicated location. This will be referred to herein as the accelerated cross-correlation.

Say then that $ch_{max}$(view) is the location of the indicated rough pin position in some view. Then define:

$$P_{blk}(k,\text{view}) = P(ch_{max}(\text{view}) - \text{win}/2 + k, \text{view}) \text{ for } 0 \le k \le \text{win}$$

where the analysis window is chosen as:

$$\text{win} = \text{ceil}(5 \times \text{Pin WidthInChannels}).$$

The factor of 5 is rather arbitrary and can perhaps be increased to gain robustness or decreased to gain speed. Then one can calculate:

$$xcorr(k', \text{view})=\text{IFFT}(\text{zeropad}(\text{FFT}(P_{blk}))\times\text{FFT}(\text{Template}')).$$

Then after one finds the value of k' that gives maximum xcorr, one calculates the pin center by:

$$ch_{pin}(\text{view})=ch_{max}(\text{view})+k'/\text{sub-win}/2$$

Note that for a scan involving rotation, the effective pin width may change as a function of magnification and thus of rotate position, however when the range of magnifications encountered is not severe, good results can usually be obtained just by using a single "typical" pin width (such as the pin width at average magnification). For schemes where the pin encounters a broad range of magnifications throughout a single acquisition, it may be desirable to incorporate a time-dependent or channel-dependent pin width.

Find Theoretical Trajectory

The following notation shall apply:

γ the angle between the central ray and some detector channel

β the rotation angle of the table

ϕ the phase of the pin (i.e. for what β value is the pin located at the top of the table)

R the normalized pin location, $$R=\frac{PinDistFromCenter}{SOD}$$

The pin will show up only at a pair of (γ,β) which satisfies the trajectory equation:

$$\tan\gamma=\frac{\sin(\beta-\phi)}{R-\cos(\beta-\phi)}$$

Find Parameters to Make the Measured Expected Trajectories Match

The general purpose of gross system geometry calibration is to find the parameters that make some geometry model produce a theoretical trajectory which matches the measured trajectory. Having found the model trajectory, we now also need the model angles. For an equally spaced detector, the model angles are:

$$\gamma_{model}(ch)=\Delta\gamma\times(ch-c_{ray}) \text{ for a curved detector}$$

$$\gamma_{model}(ch)=\arctan[\Delta\gamma\times(ch-c_{ray})] \text{ for a flat detector}$$

Combining this with the trajectory equation provides the model channel trajectory:

$$ch_{model}(\text{view})=c_{ray}+\frac{1}{\Delta\gamma}\times\arctan\left(\frac{\sin(\beta_{view}-\phi)}{R-\cos(\beta_{view}-\phi)}\right) \quad \text{for curved}$$

$$ch_{model}(\text{view})=c_{ray}+\frac{1}{\Delta\gamma}\times\frac{\sin(\beta_{view}-\phi)}{R-\cos(\beta_{view}-\phi)} \quad \text{for flat}$$

The next step is to find geometry parameters that make the model trajectory best match the measured trajectory. By one approach, this can comprise making use of a cost function to represent how different the two trajectories are. For a cost that measures differences between Δγ values and is in units such as radians or radians$^2$, the optimization can be biased towards small Δγ, while measuring cost that is unitless or that is in units of channels or views does not tend to present such an issue. This example will express the cost in units of channels by measuring the difference between the model channel trajectory and the measured channel trajectory:

$$D=\sum_{view}(ch_{model}(\text{view})-ch_{pin}(\text{view}))^2$$

Note that D as described here is inherently a function of R, Φ, Δγ, and $c_{ray}$. Thus one can search for the best values of these parameters which minimize D. Recall from the user-input explanation provided earlier that some of these may be fixed (Known) and some may be free (Estimated or Find). Note that not all of these will be of interest to the user, it can be useful to have some kind of values (either free or fixed) for all four parameters to do the fit. One may throw away one or more values after the fit. For example, the user generally doesn't care about ϕ so it can be discarded after it has been ascertained.

One can in theory use any off-the-shelf multi-dimensional search algorithm, such as gradient-based methods (such as steepest-descent), or evaluation-based methods (such as the Nelder-Mead simplex algorithm), to find the free parameters. In many cases, this is the best solution.

Another approach is to reduce the problem to a lower dimensional search (i.e. from a 4-dimensional search to a 2-dimensional search) by exploiting some expected relationships between certain parameters. This may be faster than the full-dimensional search, but can lead to inaccuracies if not done properly. Those skilled in the art will appreciate that in many cases it may be best to reduce this only to a 3-dimensional problem rather than a 2-dimensional one, thereby searching, for example, for central-ray along with other parameters. That said, one approach tailored to address the 2-dimensional approach can be expressed as follows:

If cray is a free parameter:

Set the central-ray to the average value of the trajectory:

$$c_{ray}=\frac{1}{N_{views}}\sum_{view=0}^{N_{views}-1}c_{pin}(\text{view})$$

If it appears that $c_{pin}$(view) goes outside the detector for one or more views, a warning is generated that $c_{ray}$ should be calculated first through some other method.

end

If ϕ is a free parameter (as it almost always will be):

First smooth the trajectory, $$c_{pin}^{smoothed}(\text{view})=c_{pin}(\text{view})*\rho$$

where * denotes convolution, and η is a Gaussian with a set to 3 channels wide.

Second, find the minimum and maximum of $c_{pin}$(view), and the corresponding views. Set $v_{left}$ to the view index where c is minimum, and set right to the view index where c is maximum.

Third, look near the middle of the range $v_{left}\rightarrow v_{right}$ range (wrapping around $v_b<v_a$) and find the non-integer view number $v_a$ for which $c_{pin}(v_a)\approx c_{ray}$. This can be done either by (A) searching for the value of $v_a$ where the interpolated value of $c_{pin}(v_a)$ is closest to the $c_{ray}$, or (B) by finding two consecutive view numbers where $c_{pin}$ crosses over the $c_{ray}$, then interpolating between those two $c_{pin}$ values to find the view number corresponding to $c_{ray}$. This example presumes use of the second alternative.

Fourth, set $\phi_a$ to the value of $\beta$ interpolated at view $v_a$. Set $\phi_b$ to $\phi_a+\pi$. The optimal phase is one of these two values (and which one is best will be identified later).

else

Set $\phi_a=\phi$, and ignore the steps below dealing with $\phi_b$.

end

If $\Delta\gamma$ and R are both free parameters,

Here one can use an off-the-shelf two-dimensional algorithm to find the best $\Delta\gamma$ and the best R. This can be repeated twice, once fixing $\phi=\phi_a$, and again fixing $\phi=\phi_b$, then keeping the answer that gives the lowest D. The two-dimensional search proceeds as follows:

If there is an initial guess $\Delta\gamma_0$, set $\Delta\gamma=\Delta\gamma_0$. Otherwise, set it to some arbitrary value. This example uses:

$$\Delta\gamma = \frac{5\times\frac{\pi}{180}}{Nch-1}$$

Set $\epsilon=0.1$

Repeat the following:

Make a list of one or more guesses $\Delta\gamma_{guess}(k)$ in the neighborhood of the last $\Delta\gamma$ value, where the size of the "neighborhood" is on the order of $\epsilon$. This example uses $$\Delta\gamma_{guess}(k)=\Delta\gamma\times(1+\epsilon\times\beta_k)$$

where k=1 . . . 10 and the list of $\alpha_k$ values are

−2, −1, −0.5, −0.1, −0.01, 0.01, 0.1, 0.5, 1, 2

For each k, do (i.e. using the above, for k=1 to 10)

Calculate the model angles for the measured trajectory, $$\gamma_{model}(ch_{pin}(view))$$

using the equation for $\gamma_{model}$ given earlier, using $\Delta\gamma_{guess}(k)$ Calculate the guesses for pin-radius, first for each view $$R_a(\text{view}) = \frac{\sin[\beta(\text{view}) - \phi_a + \gamma_{model}(ch_{pin}(\text{view}))]}{\sin\gamma_{model}(ch_{pin}(\text{view}))}$$

$$R_b(\text{view}) = \frac{\sin[\beta(\text{view}) - \phi_b + \gamma_{model}(ch_{pin}(\text{view}))]}{\sin\gamma_{model}(ch_{pin}(\text{view}))}$$

Then take the medians of all views $$\overline{R}_a(k)=\text{median}\{R_a(1),R_a(2), \ldots , R_a(N_{views})\}$$

$$\overline{R}_b(k)=\text{median}\{R_b(1),R_b(2), \ldots , R_b(N_{views})\}$$

Calculate $ch_{model}(view)$ using $R=\overline{R}_a(k)$ use this result to calculate $D_a(k)$ Calculate $ch_{model}(view)$ using $R=\overline{R}_b(k)$ use this result to calculate $D_b(k)$ Then find the value of k* for which at least one of either $D_a(k^*)$ and $D_b(k^*)$ is smaller than all other $D_a(k)$ and $D_b(k)$ values.

Set $\Delta\gamma$ to $\Delta\gamma_{guess}(k^*)$.

If $D_a(k^*)<D_b(k^*)$ then set $R=R_a(k^*)$, otherwise set $R=R_b(k^*)$.

Set $\epsilon$ to $\epsilon\times\alpha_k$.

Repeat until $\gamma<\gamma_{thresh}$ (In my code, I use $\gamma_{thresh}=10^{-8}$ End Note that if only one of $\Delta\gamma$ and R is allowed to be free while the other is fixed, an off-the-shelf one-dimensional search can be used to find that free parameter.

Interpret Optimization Results

Once values of $c_{ray}$, $\Delta\gamma$, R, and $\phi$ are obtained, one can interpret these into results in which the user has interest. Specifically, this illustrative example seeks values for any parameters labeled Estimated or Find, when possible. The following algorithm serves in that regard:

If (ChPitch is Known) and (SID is not Known) then SID=ChPitch/$\Delta\gamma$

ElseIf (ChPitch is not Known) and (SID is Known) then ChPitch=SID*$\Delta\gamma$ End If (FanAngle is not Known) then For a curved array, FanAngle=$\Delta\gamma\times(Nch-1)$ For a flat array, FanAngle=$\arctan((Nch-1-c_{ray})\times\Delta\gamma)+\arctan(c_{ray}\times\Delta\gamma)$ End If (PinDistFromRotAxis is Known) and (SOD is not Known) then SOD=R*PinDistFromRotAxis End It may also be desirable to, for each parameter, estimate accuracies for each of the global parameters calculated. These can for example be calculated as functions of the noise levels in the projection data, the estimated noise in the trajectory measurement, the error between the measured trajectory and the ideal trajectory, and/or from input accuracy values that are supplied for each known or estimated parameter by the user or automatically by the machine. Such accuracies can give useful information to a user regarding how well the calculated global parameter values can be trusted. The accuracies could also be taken into account by later processing steps.

For scan acquisitions other than rotate-only application settings, the above process for finding necessary global parameters may be much simpler. For a translate scan of a pin, or a digital radiograph of an angularly-disposed pin, finding the global parameter information can comprise the following steps. First, find the pin size which can be either user-supplied or found using, for example, the same pin-width searching algorithm described earlier. Second, measure the pin trajectory. Third, fit a straight line to the trajectory. The global information needed to calculate the theoretical trajectory can be merely the slope and intercept of this line.

Find Local Geometry

Once the gross geometry has been determined, the local geometry can be found. Generally speaking this can comprise first finding pin centers as view numbers as a function of channel. Next one finds the channel angles or locations that make the measured pin centers match the model trajectory. Optionally, one can then create a distortion correction table to make the channels appear to be equally spaced.

Find Pin View-Centers as Function of Channel

Here the approach seeks to obtain separate results for each channel. Accordingly, this approach treats each channel independently and hence looks across views. The ideal pin profile can again be a semi-circle or Gaussian (with this illustrative example using the semi-circle approach). The expected span of the pin in views can be often be derived from available values, for example for rotate-only scanning using:

$$PinWidthInViews = R\times PinWidthInChannels\times\frac{\Delta\gamma}{\Delta\beta}$$

where $\Delta\beta$ is the average rotation increment between views.

It may be noted that for a translate scan or digital radiograph with a single pin and a sufficiently large scan, all channels can be made to see the pin exactly once. Thus one can use essentially the same pin-finding algorithm as was detailed above with the exception of looking across views instead of across channels. For a typical 360° scan, though, most channels will see the pin either twice or never, and a few channels right at the trajectory apex will only see it once. For <360°, there may be a more significant number of channels that see the pin only once. To deal with this, and recalling from above where the view $V_{left}$ where the pin was the farthest to the left, $v_{right}$ is where the pin was the farthest to the right. Looking below $v_{left}$ and above $v_{right}$ (wrapping around if necessary), the pin appears at most once in each channel, and similarly looking below $v_{right}$ and above $v_{left}$, the pin again appears at most once in each channel. Thus one can use essentially the same pin-finding algorithm as was detailed above with the exception of: (1) running it across views instead of channels, (2) the use Pin WidthIn Views in place of Pin WidthInChannels, (3) one only need run it on the views below $v_{left}$ and above $v_{right}$, and (4) the result is a list of $view_{pin}^{a}$ (ch). Then one can run it again on the views below $v_{right}$ and above $v_{left}$, and the result is $view_{pin}^{b}$(ch). This approach of handling multiple pin events could potentially be extended even further to handle multiple pins. The following description concentrates on the example where many channels see the pin twice (as per rotate-only scanning), with the a and b subscripts corresponding to the two separate pin events.

Additionally, one can test the result of each channel:

If $$ch < \min_{0 \le view < N_{views}} ch_{pin}(\text{view}) \text{ or } ch > \min_{0 \le view < N_{views}} ch_{pin}(\text{view})$$

then we mark $view_{pin}^{a}$(ch) and $view_{pin}^{b}$(ch) as being unidentified. Also when performing the cross-correlation, if the cross-correlation value is very small, this process can provide for marking the appropriate $view_{pin}^{a}$(ch) or $view_{pin}^{b}$(ch) as being unidentified.

Find Channel Locations

Next, for a rotate-only scan, one finds the rotation angles corresponding to the measured pin view centers, $$\beta_{pin}^{a}(ch)=\text{interpolate}\beta(\text{view}) \text{ at view}=\text{view}_{pin}^{a}$$

$$\beta_{pin}^{b}(ch)=\text{interpolate}\beta(\text{view}) \text{ at view}=\text{view}_{pin}^{b}$$

Note that if the scan is ≧360° then the interpolation should wrap around.

Then make two estimates of γ:

$$\gamma_a(ch) = \arctan\frac{\sin(\beta_{pin}^{a} - \phi)}{R - \cos(\beta_{pin}^{a} - \phi)}$$

$$\gamma_b(ch) = \arctan\frac{\sin(\beta_{pin}^{b} - \phi)}{R - \cos(\beta_{pin}^{b} - \phi)}$$

Now, recall that some of $view_{pin}^{a}$(ch) and/or $view_{pin}^{b}$(ch) may be undefined. Thus, if both are defined, then $$\gamma(ch) = \frac{\gamma_a(ch) + \gamma_a(ch)}{2}$$

If just $view_{pin}^{a}$(ch) is defined, then $$\gamma(ch)=\gamma_a(ch)$$

or if just $view_{pin}^{b}$(ch) is defined, then $$\gamma(ch)=\gamma_b(ch)$$

And if neither are defined, one likely cannot usefully measure y for that channel. The missing value(s) can be extrapolated/interpolated from the successfully calibrated channels.

For a translate-only scan or a digital radiograph of a tilted pin, it can be more natural to calculate spatial locations, or normalized spatial locations, rather than angles. In this case, if one has already determined a straight-line fit for channel versus view during the global parameter generation, one need only calculate the distance of the measured trajectory points from this line to find the location of each channel (i.e., by measuring how different the measured and theoretical view are for the same channel). This measurement can be normalized so that the position of the first channel is fixed to 0, the position of the last channel is fixed to 1, and the normalized positions of all intervening channels indicate where the channels are located on a line connecting the first and last channels. If desired, one can straightforwardly transform these to accurate un-normalized values, or calculate channel angles from these coordinates, if one knows the global system geometry (such as by the user providing it, or by measuring it from an auxiliary rotate-only scan using the approach described above). In other cases, such as when the end goal is to feed the channel locations to an image rendering approach, or when a distortion table is to be generated and the global geometry is to be measured later, the normalized values may be all that are necessary.

Local-Geometry Output

Once measured, these channel locations may be used directly as noted above, say by backprojecting onto the measured values. In such cases, it may be useful to store these values in a calibration table to use with future scans (even perhaps scans taken with a drastically different acquisition mode). Or alternatively, one may wish a distortion-correction table so that after one applies it to the data, the channel locations of the corrected data will appear to be equally spaced. This table could also be stored for use with future scans. Conveniently, a distortion table can be found by calculating the model channel locations using the theoretical trajectory, and interpolating a set of integer indices using these model locations as source-points for the interpolation and the measured locations as target-points for the interpolation. For example, when the channel locations are angles, then the distortion table can be found by interpolating the points described by $x_{in}=\gamma_{model}$(ch), $y_{in}$=ch at the points $x_{out}=\gamma$(ch). Then the resulting $y_{out}$ is the distortion table. For data that is resampled using this distortion table, the data can be imagined as having come from a virtual scanner that is characterized by the global geometry values that were used to generate the theoretical trajectory.

Those skilled in the art will appreciate that, as yet an alternative in these regards, the calibration result might comprise instead the interpolation indices and/or weights that can be employed to resample the data from the measured locations to equally spaced locations.

Figure 3:
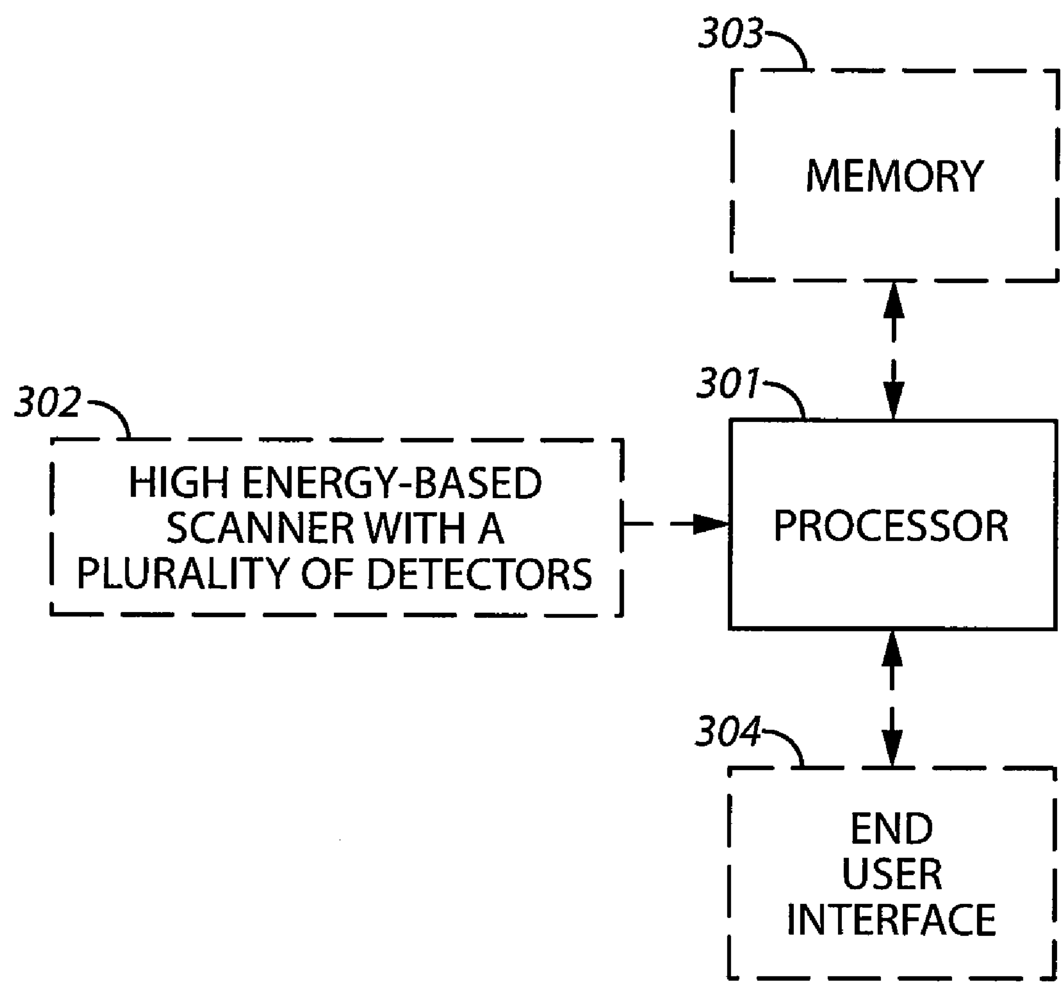
FIG. 3 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 3, an illustrative approach to such a platform will now be provided.

In this illustrative example the enabling platform comprises a processor 301. Those skilled in the art will recognize and appreciate that such a processor can comprise a fixed-purpose hard-wired platform or can comprise a partially or wholly programmable platform. All of these architectural options are well known and understood in the art and require no further description here aside from noting that a general purpose personal computer can serve well in these regards.

This processor 301 operably couples to a high energy-based scanner having a plurality of detectors 302 such as has been described above. This can comprise a relatively direct connection or can simply comprise an importing of data via whatever means are chosen from that scanner. The processor 301 can also operably couple to a memory 303 and/or an end user interface 304. The memory 303 can contain, for example, the data from the scanner 302, intermediary results, and/or the resultant detector-level calibration information. This memory 303 can also contain, if desired, the operating instructions by which the processor 301 carries out one or more of the aforementioned steps, actions, and functions. The end user interface 304, in turn, can provide a mechanism by which an end user provides input to the processor 301 and/or by which the results of these teachings are provided to the end user.

This processor 301 is configured and arranged, via, for example, corresponding programming as will be well understood by those skilled in the art, to carry out one or more of the steps as has been described herein. This can comprise, for example, calculating a theoretical trajectory as pertains to relative movement as between the plurality of detectors and a calibration object as a function of known geometry parameters for the high energy-based scanner 302 and determining, for each of at least some of the plurality of detectors, a value that corresponds to a difference between the theoretical trajectory and the observed trajectory to thereby provide the detector-level calibration information.

Those skilled in the art will recognize and appreciate that these teachings are well suited for a number of application settings where prior art practices provide less satisfactory results. As but one example in this regard, these teachings are very well suited to accommodate large detector arrays (including even L-shaped detector arrays) that are designed for industrial and security settings where large objects, such as trucks, are scanned and assessed. Another example in this regard is for CT systems that use a modular detector construction where gaps may occur between detector modules—without proper measurement and correction, these gaps can easily induce artifacts in the form of rings or arcs in rotate-only CT scans. Yet another example in this regard is for CT using detectors that use optical tapers, where warpings in the optical taper, if not properly measured and corrected, can produce blurring or doubling artifacts.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method to facilitate providing calibration information for a given high energy-based scanner having a plurality of detectors, comprising:

at a processor:

forming detector-level calibration information for the given high energy-based scanner by:

calculating a theoretical trajectory as pertains to relative movement as between the plurality of detectors and a calibration object as a function of known geometry parameters for the given high energy-based scanner;

developing a corresponding observed trajectory for the calibration object in response to relative movement as between the plurality of causing a relative movement as between the plurality of detectors and a calibration object to develop a corresponding observed trajectory for the calibration object in response to the caused relative movement between the plurality of detectors and a calibration object.

2. The method of claim 1 wherein the calibration object comprises at least one of:

a pin oriented substantially parallel to the rotation axis when the relative movement comprises eccentric rotation of the calibration object with respect to an axis point;

an angularly-disposed pin when the relative movement comprises linear movement of the calibration object with respect to the plurality of detectors;

a pin oriented substantially perpendicular to a direction of motion when the relative movement comprises linear movement of the calibration object with respect to the plurality of detectors.

3. The method of claim 1 wherein developing a corresponding observed trajectory for the calibration object comprises measuring the observed trajectory by, on a detector-by-detector basis, analyzing the observed projection data to determine a position of the calibration object where a predetermined feature of the calibration object appears to have passed through a predetermined portion of a channel as corresponds to each detector.

4. The method of claim 1 wherein developing a corresponding observed trajectory for the calibration object comprises measuring the observed trajectory by, on a detector-by-detector basis, analyzing the projection data to determine a time when a predetermined feature of the calibration object appears to have passed through a channel center.

5. The method of claim 1 wherein forming detector-level calibration information for the given high energy-based scanner further comprises:

using the value to determine a spatial relationship between at least some of the plurality of detectors and a given location as pertains to the given high energy-based scanner.

6. The method of claim 1 further comprising:

obtaining global calibration information for the given high energy-based scanner; and using the global calibration information to calculate a calculated trajectory for the calibration object;

and wherein calculating a theoretical trajectory as pertains to relative movement as between the plurality of detectors and a calibration object as a function of known geometry parameters for the given high energy-based scanner comprises using the calculated trajectory and an empirically observed trajectory to provide the theoretical trajectory.

7. The method of claim 6 further comprising:

modifying at least some of the global calibration information as a function, at least in part, of the empirically observed trajectory.

8. The method of claim 6 wherein using the calculated trajectory and an empirically observed trajectory to provide the theoretical trajectory comprises identifying at least one modification parameter which, when applied to the calculated trajectory, causes the theoretical trajectory to better match the observed trajectory.

9. The method of claim 1 wherein determining, for each of at least some of the plurality of detectors, a value that corresponds to a difference between the theoretical trajectory and the observed trajectory comprises accounting for each detector that detects the calibration object for more than one observed point in time.

10. The method of claim 9 wherein accounting for each detector that detects the calibration object for more than one observed point in time comprises combining different measurements for a detector that detects the calibration object for more than one observed point in time.

11. The method of claim 1 further comprising:

using the detector-level calibration information to modify a reconstruction approach that assumes that all detectors are equally spaced apart from one another.

12. The method of claim 11 wherein using the detector-level calibration information to modify a reconstruction approach that assumes that all detectors are equally spaced apart from one another comprises at least one of:

modifying a filtered back-projection algorithm as a function of the detector-level calibration information;

modifying an iterative statistical reconstruction algorithm as a function of the detector-level calibration information; and resampling data as a function of the detector-level calibration information to cause the data to appear as though the detectors are equally spaced apart.

13. The method of claim 1 further comprising:

using the detector-level calibration information to provide detector locations to a reconstruction approach that uses a presently known irregular ray sampling pattern.

14. The method of claim 13 wherein using the detector-level calibration information to provide detector locations to a reconstruction approach that uses a presently known irregular ray sampling pattern comprises at least one of:

a filtered back-projection algorithm;

an iterative statistical reconstruction algorithm; and resampling data as a function of the detector-level calibration information to cause the data to appear as though the detectors are equally spaced apart.

15. The method of claim 1 further comprising:

using the detector-level calibration information to provide data locations to an image rendering approach.

16. The method of claim 15 wherein the image rendering approach comprises a data resampling approach.

17. An apparatus to facilitate providing calibration information for a given high energy-based scanner having a plurality of detectors, comprising:

a processor being configured and arranged to form detector-level geometric calibration information for the given high energy-based scanner by:

calculating a theoretical trajectory as pertains to relative movement as between the plurality of detectors and a calibration object as a function of known geometry parameters for the given high energy-based scanner;

causing relative movement as between the plurality of detectors and a calibration object to develop a corresponding observed trajectory for the calibration object;

determining, for each of at least some of the plurality of detectors, a value that corresponds to a difference between the theoretical trajectory and the observed trajectory to thereby provide the detector-level geometric calibration information.

18. The apparatus of claim 17 wherein the processor is further configured and arranged to use the value to determine a spatial relationship between at least some of the plurality of detectors and a given location as pertains to the given high energy-based scanner.

19. The apparatus of claim 17 wherein the processor is further configured and arranged to:

obtain global calibration information for the given high energy-based scanner; and use the global calibration information to calculate a calculated trajectory for the calibration object;

and wherein the processor is further configured and arranged to calculate a theoretical trajectory as pertains to relative movement as between the plurality of detectors and a calibration object as a function of known geometry parameters for the given high energy-based scanner by using the calculated trajectory and an empirically observed trajectory to provide the theoretical trajectory.

20. The apparatus of claim 17 wherein the processor is configured and arranged to determine, for each of at least some of the plurality of detectors, a value that corresponds to a difference between the theoretical trajectory and the observed trajectory by accounting for each detector that detects the calibration object for more than one observed point in time.

* * * * *

UNITED STATES PATENT AND TRADEMARK OFFICE

CERTIFICATE OF CORRECTION

PATENT NO. : 7,922,390 B2
APPLICATION NO. : 12/046337
DATED : April 12, 2011
INVENTOR(S) : Kevin Holt et al.

It is certified that error appears in the above-identified patent and that said Letters Patent is hereby corrected as shown below:

IN THE CLAIMS:
Claim 1, Column 19, Line 64; delete "developing a corresponding observed trajectory for the calibration object in response to the relative movement as between the plurality of".

Claim 1, Column 20, Line 4; after "object" delete "." and insert --; determining, for each of at least some of the plurality of detectors, a value that corresponds to a difference between the theoretical trajectory and the observed trajectory to thereby provide the detector-level calibration information.--.

Signed and Sealed this
Twenty-sixth Day of July, 2011

David J. Kappos
*Director of the United States Patent and Trademark Office*